United States Patent [19]
Uomini

[11] Patent Number: 5,815,663
[45] Date of Patent: Sep. 29, 1998

[54] DISTRIBUTED POSTING SYSTEM USING AN INDIRECT REFERENCE PROTOCOL

[75] Inventor: Robert Uomini, Kensington, Calif.

[73] Assignee: The Robert G. Uomini and Louise B. Bidwell Trust, Kensington, Calif.

[21] Appl. No.: 615,483

[22] Filed: Mar. 15, 1996

[51] Int. Cl.[6] .................................................. G06F 15/16
[52] U.S. Cl. ................................ 395/200.49; 395/200.36
[58] Field of Search ..................... 395/200.09, 200.15, 395/683, 200.49, 200.57, 200.33, 200.48, 200.47, 200.75, 200.36; 707/3

[56] References Cited

U.S. PATENT DOCUMENTS

| | | | |
|---|---|---|---|
| 5,418,908 | 5/1995 | Keller | 395/200.36 |
| 5,572,643 | 11/1996 | Judson | 395/200.48 |
| 5,617,565 | 4/1997 | Augenbraun et al. | 707/4 |
| 5,649,192 | 7/1997 | Stucky | 707/530 |
| 5,659,729 | 8/1997 | Nielsen | 707/3 |
| 5,708,825 | 1/1998 | Sotomayor | 707/501 |
| 5,712,979 | 1/1998 | Graber et al. | 395/200.48 |
| 5,721,908 | 2/1998 | Lagarde et al. | 395/200.32 |

OTHER PUBLICATIONS

WAIS Information Services (Rik Harris), Computer Science Technical Report Archive Sites, header, p. 1, Dec. 14, 1994.
Technical Intelligence MN USA, The Trading List for May, header, p. 1, Apr. 30, 1995.
llurch@networking.standford.edu, cmsg cancel, header, p.1, Oct. 5, 1995.
uomini@fractrals.fractracls.com, test, header, p. 1, Mar. 5, 1996.
Horton, M., Standard for Interchange of USENET Messages, pp. 1–19, Dec. 1987.
"Cyberdog: Internet Tools are a Cool but Incomplete Showcase for Technology," *Macworld*, Sep. 1996, pp. 56–57.
"Vnews: a Multicast, Multimedia News Service with Virtual Message(sic)," Scottsdale, AZ Conference Proceedings of the IEEE 15th Annual International Conference on Computers and Communications. Published in New York, IEEE Comput. Society, Mar. 29, 1996.
Baker, David W.; (dwb@brown.edu) Posting to newsgroup *comp.infosystems.www.misc*, "RE: html in usenet posts." Distributed by Dejanews, *www.dejanewss.com*, May 12, 1995.
Hennecke, Marcus Edward; Posting to newsgroup *comp.infosystems.www.misc*, "RE: html in usenet posts." Distributed by Dejanews, *www.dejanews.com*, May 12, 1995.
Request for Comments 2017, pp. 1–4, located at *http://www.pmg.lcs.mit.edu/cgi–bin/rfc/view?number=2017*.
Request for Comments 1521, pp. 1–59, located at *http://www.pmg.lcs.mit.edu/cgi–bin/rfc/view?1521*.

*Primary Examiner*—Richard L. Ellis
*Assistant Examiner*—Patrice L. Winder
*Attorney, Agent, or Firm*—Philip H. Albert; Townsend and Townsend and Crew LLP

[57] ABSTRACT

Markup language news posting is provided by imbedded headers pointing to markup language component files which are either directly included as attachments or indirectly included by universal resource locators included in a header of a posted file. A fallback message is included with the posted file so that the article is intelligible to readers which are not markup language aware. Markup language electronic mail messaging is accomplished in a similar manner.

12 Claims, 7 Drawing Sheets

```
Newsgroups: misc.test
Path: pwa.acusd.edu!news
From: uomini@fractals.fractals.com
Subject: test
X-Nntp-Posting-Host: sparc5.fractals.com
Content-Type: text
Content-Length: 2938
Message ID: <DnwMG5.7GK@pwa.acusd.edu>
X-Fractalimgs-Primary-Homepage: http://www.primary.fractals.com/docs/post.html
X-Fractalimgs-Secondary-Homepage: http://www.foo.fractals.com/html/post.html
Sender: news@pwa.acusd.edu
Organization: The Fractal Images Company
X-Newsreader: WebReader Version 0.0 (preBeta)
Date: Thu, 7 Mar 1996 15:45:40 GMT
```

Fallback Explanation Text

Fallback Message Text

Fig. 2

DISTRIBUTED POSTING SYSTEM USING AN INDIRECT REFERENCE PROTOCOL

BACKGROUND OF THE INVENTION

The present invention relates to network news and more particularly to a system for posting markup language articles to a news group or sending electronic mail messages.

A popular feature of many online networking systems is a news network. In a news network, users can be either posters, readers or both. Posters post messages ("articles") on a particular subject to the news group dedicated to that subject and readers select the news groups of interest to them for reading the articles therein. Readers can post responses to the news group for viewing by others who subscribe to that news group. The types of messages which can be sent depend on the particular news networks. Some news networks might only allow articles to comprise lines of text, while others might allow for posting images. Therefore, as used herein, the term "article" refers to a unit of information of the type which is accepted by the particular news network into which the posting is sent.

News networks can be either centralized or distributed. In a centralized news network, all the articles are posted and stored in one physical or logical location. News networks hosted by commercial on-line services are examples of centralized news networks. CompuServe Incorporated, of Columbus, Ohio, U.S.A., operates the CompuServe information service which includes a news network organized into news groups ("forums") which are located in one place. This is possible since CompuServe maintains control over all the interactions of its users and the servers which receive, send and store news articles. America Online, Inc. of Vienna, Va., U.S.A. is another online service company which operates a news network. America Online maintains a collection of clubs arranged by topic, many of which have message boards where articles are posted and read. Thus, America Online is also a centralized news network. Internal corporate news networks are typically implemented as centralized news networks, because of the ease with which they can be maintained.

The most widespread news network is Usenet, which operates over the Internet, a world-wide collection of interconnected networks. Usenet is a distributed news network. Usenet is not operated by any one entity, but exists by the collective efforts of each of the news servers connected to the Internet. The distributed nature of Usenet is due to the fact that a poster does not necessarily send an article to a specific server, but posts it to the poster's local Usenet news server. Periodically, each Usenet news server will contact other Usenet news servers to exchange copies of articles which are present on one news server but not the other. In this way, an article gradually propagates from the poster's local news server to all other news servers which carry the news group to which the article was sent.

One of the major drawbacks of the Usenet architecture is that a great deal of Internet traffic is consumed by news servers passing copies of large articles and a great deal of storage space on each news server is taken up by storage for these large articles, with little consideration of who, if anyone, will be reading the articles. Because a Usenet news server might service up to 16,000 or more news groups, much of the news on a particular news server might never be read by the users obtaining news from that server.

Another disadvantage of news networks, Usenet in particular, is that the reader is not immediately presented with the article in the display form desired by the poster, unless the article is a simple text message. If the poster desires to post an image or to refer to an HTML (HyperText Markup Language) page, the poster must describe to the reader how to retrieve and display the article in the preferred form. Some news readers, such as the Netscape Navigator™ news reader available from Netscape Communications Corporation, of Mountain View, Calif., U.S.A. or the Emissary™ news reader available from Attachmate Corporation or Bellevue, Wash., U.S.A., will scan an article and provide clickable anchors for fully qualified universal resource locators (URL's), but the reader must still navigate to those URL's after reading the message posted to the news server.

In view of the failings of the prior art, what is needed is an efficient system for providing news posting which allows for presentation of information in a form desired by the poster.

SUMMARY OF THE INVENTION

The present invention provides a system for news network management which allows a poster to post an article which might comprise multiple component files of varying type combined in the article by hypertext references in a posted message. The posted message can either be a self-contained article (direct posting) or a smaller message containing fixed URL's referring to component files (indirect posting). A posted file might also contain a nonmarkup, fallback message so that the article is intelligible to readers using news readers which are not markup language aware ("MLA"). In one embodiment, the component files are included in the posted message, which is posted to the news network in a conventional manner, and a markup language news reader according to the present invention includes a markup text display client to collect, format and display markup text and graphical components of an article.

In an alternate embodiment, the present invention is used for posting messages in a similar manner to an electronic mail network instead of a news network.

A further understanding of the nature and advantages of the inventions herein may be realized by reference to the remaining portions of the specification and the attached drawings.

BRIEF DESCRIPTION OF THE DRAWINGS

FIG. 2 is an illustration of an indirect posted file with references to article components.

Appendices are attached to the end of the Description section. Appendix A is a listing of the contents of the indirect access posted file illustrated in FIG. 2. Appendix B is a listing of the contents of the direct access posted file illustrated in FIG. 3. The listings show the actual contents of the posted file, not what might be displayed in a conventional reader. It should be apparent, however, that other header fields might be added without departing from the intent of the invention and that not all header fields shown are required for proper operation.

DESCRIPTION OF THE PREFERRED EMBODIMENT

While the present invention is not limited to Usenet-type news networks or distributed networks, the preferred embodiments will be, for the most part, described with reference to the Usenet news network. In this description, the news servers will be assumed to be NNTP (network news transport protocol) servers although, as is well known in the art, non-NNTP servers can serve news traffic. An alternate embodiment, for use with electronic mail networks, will also be described.

Figure 1:
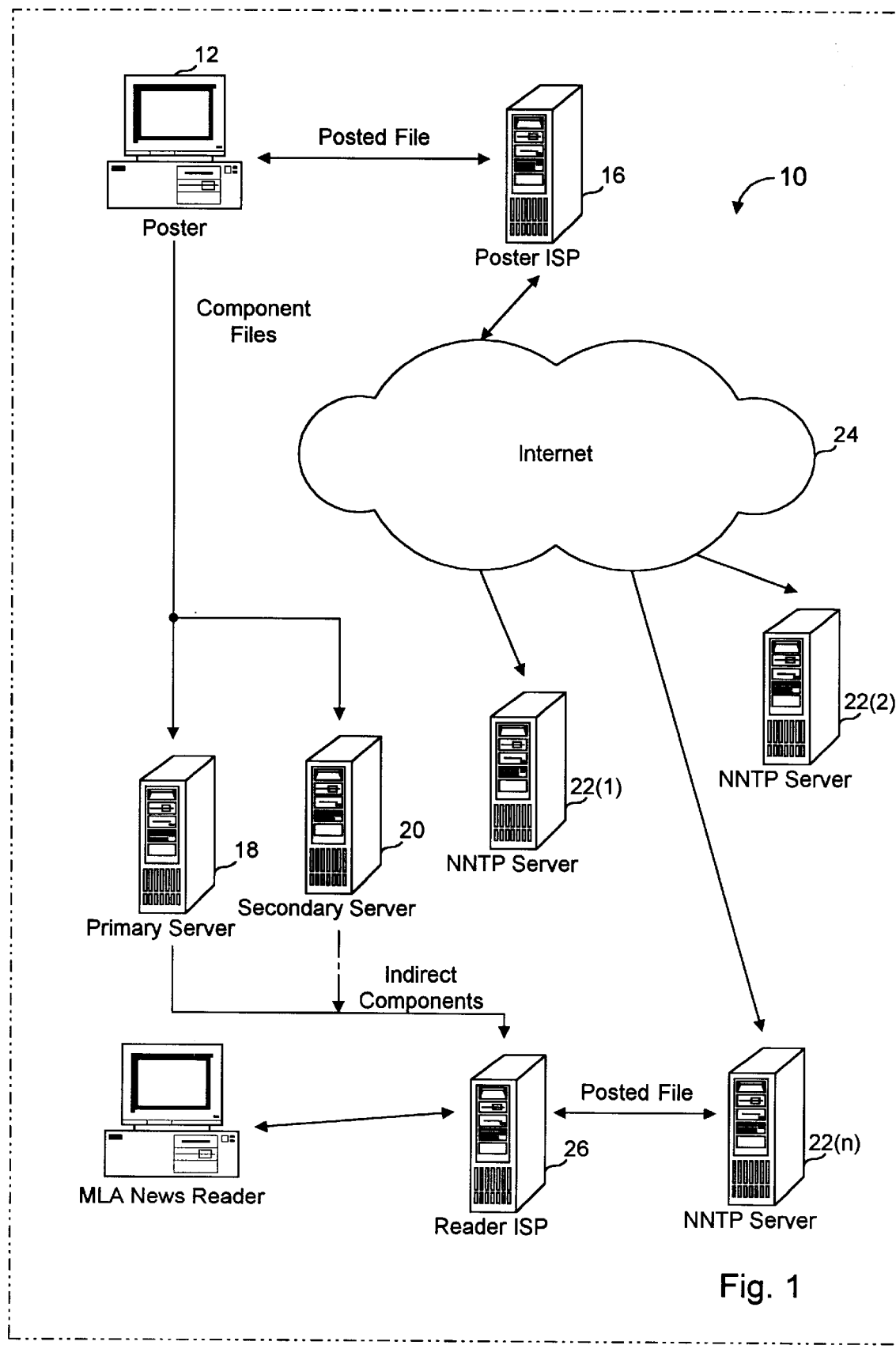
FIG. 1 is a block diagram of a news network.

FIG. 1 is a logical block diagram of a news network 10 which has the general goal of accepting articles from a poster 12 for display by news reader 14, which is a markup language aware (MLA) news reader. As is well known in the art, poster 12 need not be a person at a terminal or computer, but might be a process executing on a poster computer system. Likewise, news reader 14 need not be a computer terminal presenting the article to a person, but can be a news scanning process executing on a news scanning computer. From the perspective of news network 10, however, the handling of news articles is the same.

Figure 5:
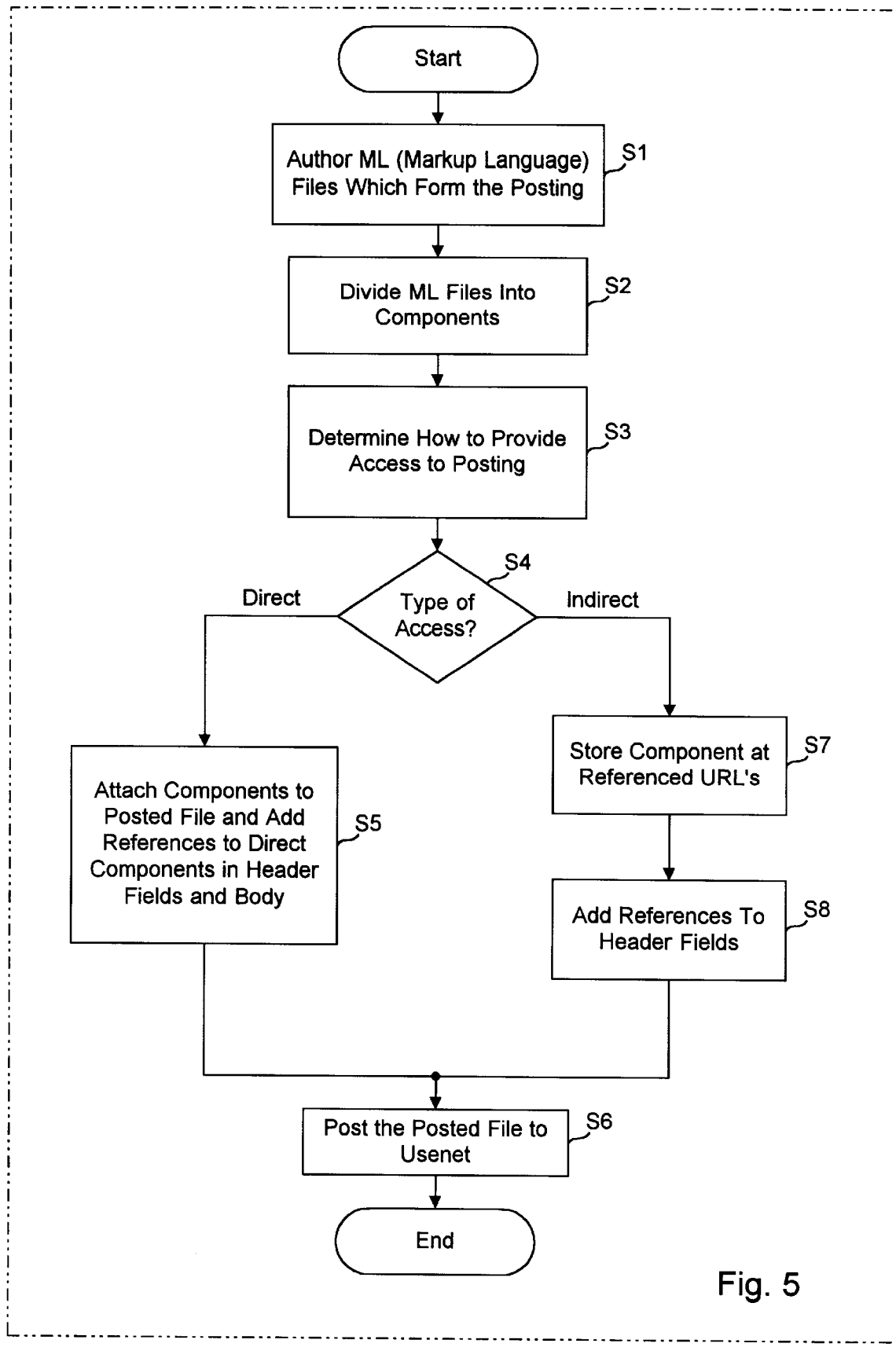
FIG. 5 is a flow chart of a posting process according to the present invention.

To initiate the process of posting the article, poster 12 sends a posted file to the poster's Internet Service Provider (ISP) 16, or more precisely, to the ISP's news server. Depending on whether the posted file is a direct access posted file or an indirect access posted file, poster 12 might also send component files to a primary server 18 and a secondary server 20. The details of the posting procedure are shown in FIG. 5 and discussed below in the description accompanying FIG. 5. A posted file is a conventional article with added header fields. This posted file is conventional in that it has a header and a body and can be processed by existing news networks as an ordinary article. This is one way the present invention provides a measure of backwards compatibility.

The posted file is sent to NNTP servers 22 via the TCP/IP connection provided by Internet 24, as is well known in the art of news transport. When news reader 14 desires to retrieve an article for display for processing, it requests the article from reader ISP 26. Reader ISP 26 retrieves the posted file from its NNTP server 22, which in this case is NNTP server 22(n). If the posted file is a direct access posted file, news reader 14 builds a markup language page from the components attached to the posted file, as explained below. A markup language is a set of rules which define how tags embedded in a text document are to be interpreted when the document is to be displayed. Examples of known markup languages are HTML (HyperText Markup Language) and nroff/troff which is commonly used with the Unix operating system. HTML tags indicate formatting commands (bold, font size, line breaks, bullets, etc.) as well as hypertext references (anchors to URL's, etc.). Some of the hypertext references might refer to already existing resources, while others might refer to resources which only are relevant in the context of the article. The latter are typically provided as "component files" or "components." The markup language used in the following examples is HTML.

If the posted file is an indirect access posted file, reader ISP 26 retrieves the indirectly stored component files from primary server 18. Should primary server 18 be unavailable or be unable to serve the files, reader ISP 26 will attempt to retrieve the component files from secondary server 20. If the indirect component files are retrieved, they are provided to news reader 14 which then constructs the markup language page (MLP) for display or further processing. If neither primary server 18 nor secondary 20 is able to serve the component files, a fallback message is displayed.

FIG. 2 is an illustration of a posted file 40, which is an indirect access posted file. Appendix A is a complete listing of the posted file 40. Posted file 40 is the file that poster ISP 16 sends to NNTP servers 22. Posted file 40 comprises a header 42 and a body 44. Body 44 is a fallback message which is displayed only when a MLA news reader is not used or if both primary server 18 and secondary server 20 (if specified) are unresponsive. The fallback message might include a fallback explanation message which provides instructions to a user using a non-MLA news reader as to how to view the article as an MLP.

Header 42 includes two header fields not found in a conventional posted file, X-Fractalimgs-Primary-Homepage and X-Fractalimgs-Secondary-Homepage. These two header fields provide pointers to a primary home page and a secondary home page, respectively. As explained below, the URL of the primary home page is the resource used to generate the MLP version of the article. The secondary home page, which is usually a copy of the primary home page, is used only when the primary home page cannot be reached by reader ISP 26. The fallback message is usually a "stripped" version of the home page for the article, with any formatting and links removed to form an ordinary ASCII text document.

Figure 3:
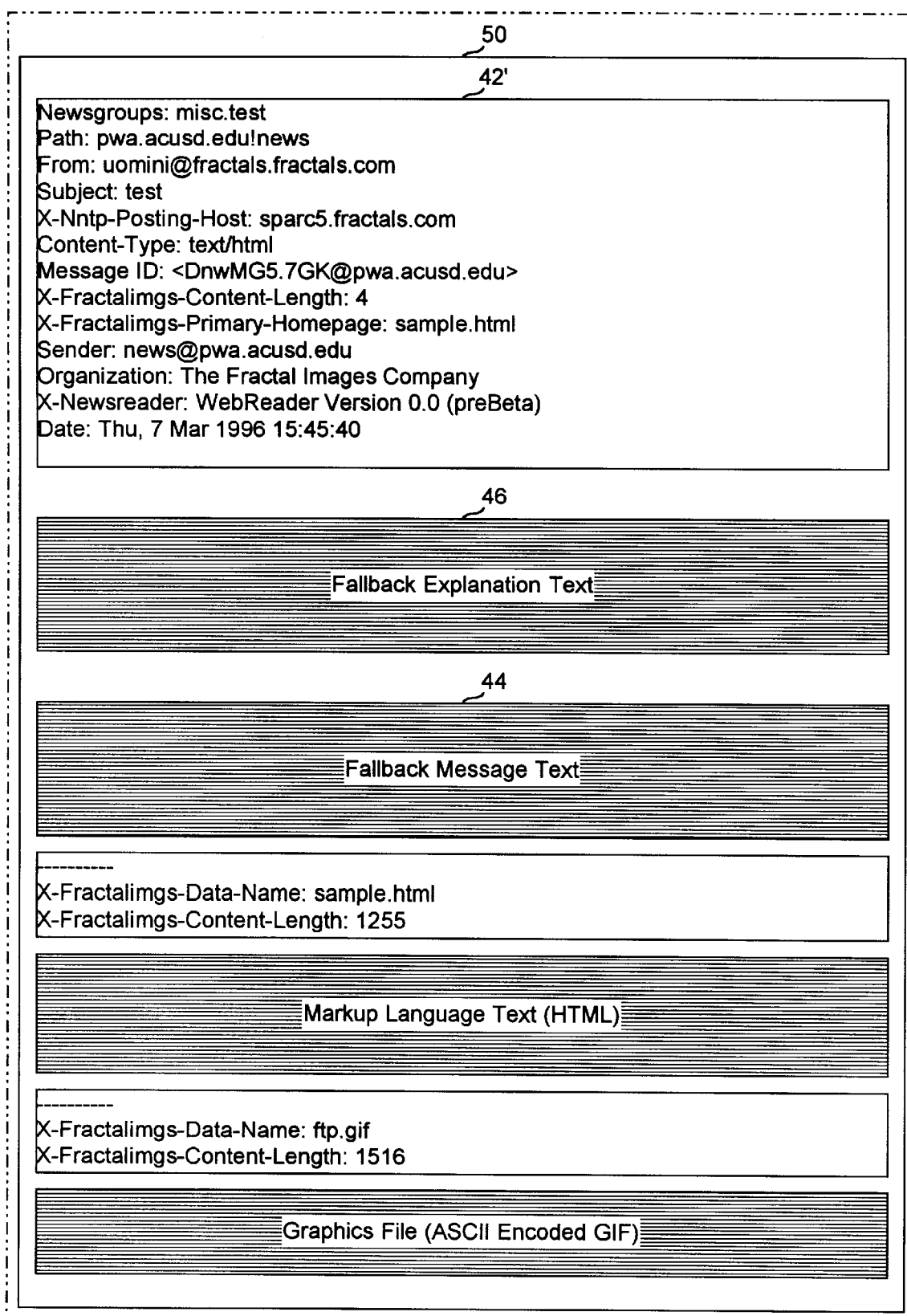
FIG. 3 is an illustration of a direct posted file with article components included in the posted file.

FIG. 3 shows a posted file 50 which is a direct access posted file. Appendix B is a complete listing of posted file 50. Posted file 50 is shown containing a header 42'. Body 44 includes a fallback message with a fallback explanation 46, as well as an attachment which is a component file 52. The X-Fractalimg-Primary-Homepage and the X-Fractalimgs-Content-Length headers are used to construct the MLP version of the article as explained below.

Figure 4A:
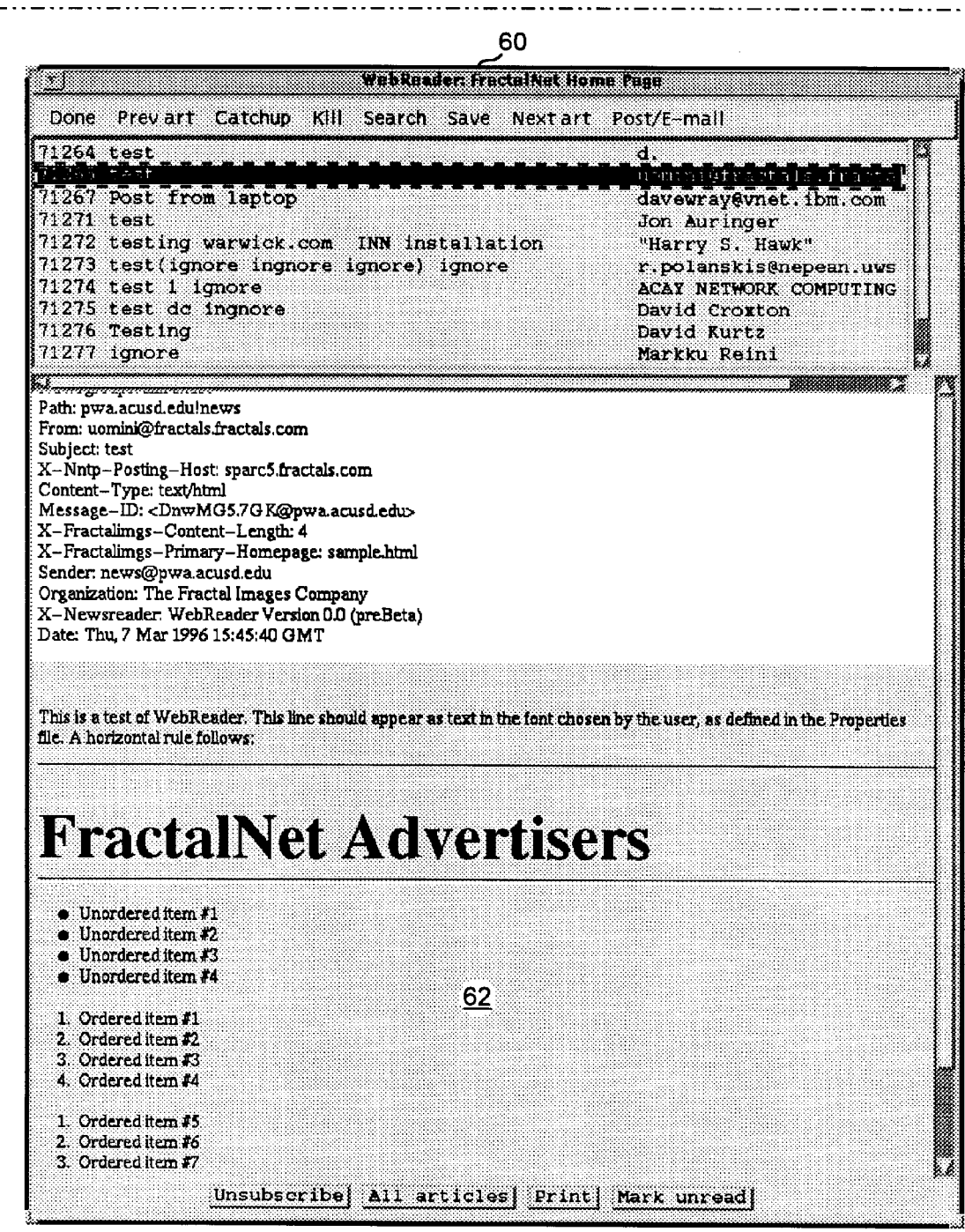
FIG. 4A is a screen display of a markup language page (MLP) view of a portion of the article shown in FIG. 3 and Appendix B.
Figure 4B:
FIG. 4B is a screen display of the MLP view shown in FIG. 4A, with the article scrolled partway down.

Whether done by direct access posting or indirect access posting, FIG. 4 shows an example of how the MLP version of the article might appear on a user's display. It should be noted that the example used herein is a relatively simple markup language article, and many advantages of the present invention are much more apparent where a markup language document is more complex, such as one which contains multiple images and links to other files. However, for clarity, the example shown in FIGS. 2–4 is a relatively simple article. MLP display 60 shows the article in MLP form as display element 62. As should be apparent from FIG. 3 and Appendix B, display element 62 is a MLP view of the HTML text included in posted file 50 as component 52.

FIG. 5 is a flow chart describing the process of authoring an article. The steps are numbered S1 through S8 and are executed by poster 12 or poster ISP 16 in numerically increasing order except where otherwise noted.

In step S1, the author of the article creates markup language (ML) text files which form the article. This is done using tools well known in the art to create ML files with links to other ML text files, ordinary text files, images or other file types. Preferably, all the links are expressed as links relative to one page which is designated the home page for the article. ML text filed might also include formatting tags and/or applet scripts.

In step S2, the article is separated into its component files, and in step S3 poster 12 determines whether the article will be a direct access posted article or an indirect access posted article. Alternatively, this decision could be made by poster ISP 16. The decision can be made based on the size of the article, the access rights of the author, the access rights of the intended readers and their capabilities, as well as a number of other factors. For example, if the size of all the component files combined is small, the direct access method might be preferred. Also, if the poster does not have sufficient access to Internet resources such as a publicly accessible directory or an HTTP server, such poster would be limited to posting using the direct access method. Where a poster has access to a publicly accessible directory on a machine which has an NNTP server or an FTP server, the poster might want to use indirect access method, especially if the component files are large or of a nature that an NNTP servers would refuse to carry the files. An example of such files is large digitized video clips, which some operators of NNTP servers refuse to carry because of space and bandwidth considerations.

The process branches at step S4 depending upon the type of access. If the access is direct access, process flows to step S5, where each component file is packaged as an attachment to the posted file with references linking the components together. This packaging occurs as shown in FIG. 3 and Appendix B, where the home page is labeled with a data name and content length and header 42 includes a header field indicating the data name for the home page. Each of the direct access components and the header section include a content length header to identify the end of each component.

In step S6, the posted file with its components is posted to the Usenet in the conventional manner.

If, at step S4, the indirect access method is selected, the process flows to step S7 where the components are stored at the primary and secondary servers. Then, a reference is generated for each component and the primary and secondary references are included in the appropriate header fields (S8). Generally, only one reference needs to be included in the posted file, namely a reference to the home page of the article. Of course, the secondary reference is not required, but lessens the chance that the reader will be able to obtain the files needed to properly view the article.

The posted file is posted to Usenet in step S7 and the authoring process is complete. The Usenet system then propagates the posted file as is done with non-MLA posted files.

Figure 6:
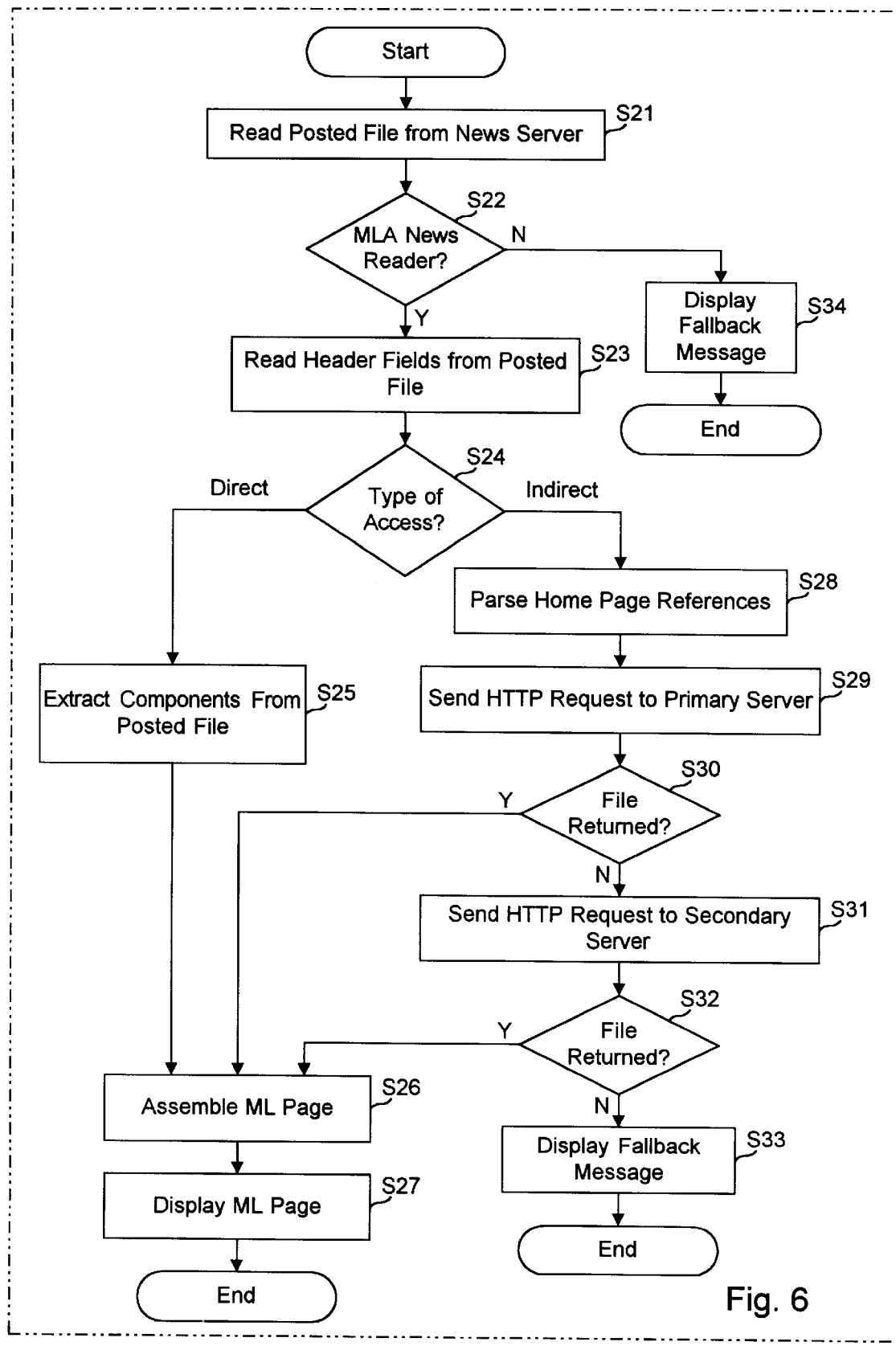
FIG. 6 is a flow chart of a news reading process according to the present invention.

FIG. 6 is a flow chart of a process of reading an ML article. The steps in FIG. 6 are labeled from S21 through S34 and are performed in numerically increasing order except where otherwise indicated.

In step S21, reader ISP 26 or news reader 14 reads the posted file from an NNTP server. At step S22, reader ISP 26 determines whether ML news reading is enabled. If it is not, the fallback message is displayed at step S34 and the news reading process ends. Otherwise, if ML news reading is enabled, the process continues with step S23 and the header is read from the posted file. News reader 14 can determine by reading the header fields whether the type of access is direct or indirect and at step S24, the process branches according to the type of access.

If the article is a direct access posted, the process continues with step S25, where components are extracted from the posted file as explained above. Next, at step S26, the components are assembled into an MLP and at step S27 the MLP page is displayed and the reading process ends. Of course, the reader could choose to scroll through the display and/or navigate through the link structure provided by the ML text if it contained tags for hypertext links.

If the posting is determined to be indirect access posted, news reader 14 parses the home page references from the header of the posted file (S28) and sends an HTTP request to the primary server identified in the primary home page header field (S29). News reader 14 determines if a file was returned successfully within a time allotted for a response (S30) and if so, the process flows to step S26 and S27 where the MLP is assembled and displayed. If the requested primary home page file is not obtained within the allotted time at step S30, news reader 14 sends an HTTP request to the secondary server identified in the header (S31). If it is determined at step S32 that the file is not returned from the secondary server, the fallback message is displayed (S33) and the reading process ends. Otherwise, the ML page is assembled and displayed.

An improved news network according to the present invention has now been described. After reading the above description, it should be apparent that such a news network has advantages over existing news networks, while being completely compatible with existing news networks.

The present invention works equally well with electronic mail networks instead of news networks. For example, if the NNTP servers were instead SMTP (Simple Mail Transport Protocol) servers and the posted file contained a "To:" header field, the posted file can be posted to an SMTP server. The mail reader would then follow the same procedure set out in the flow chart of FIG. 6 to retrieve any necessary components and construct an MLP for viewing or processing by the reader. Often, reader ISP 26 serves as the reader's NNTP server as well as the reader's SMTP server and POP or POP3 (Post Office Protocol) server to hold mail to be delivered to the reader upon request.

The above description is illustrative and not restrictive. Many variations of the invention will become apparent to those of skill in the art upon review of this disclosure. For example, although separate servers are shown in FIG. 1, the functionality of several separate servers might be combined into a single server. Furthermore, the Internet need not actually be interposed between the author and the reader, as both might be connected directly to a common ISP, or might be connected to an internal network. The scope of the invention should, therefore, be determined not with reference to the above description, but instead should be determined with reference to the appended claims along with their full scope of equivalents.

Appendix A. Indirect Access Posted File and Components

1. RESOURCE: Posted File

Newsgroups: misc.test
Path: pwa.acusd.edu!news
From: uomini@fractals.fractals.com
Subject: test
X-Nntp-Posting-Host: sparc5.fractals.com
Content-Type: text

---

Appendix A. Indirect Access Posted File and Components

---

Content-Length: 2938
Message ID: <DnwMG5.7GK@pwa.acusd.edu>
X-Fractalimgs-Primary-Homepage: http: //www.primary.fractals.com/docs/post.html
X-Fractalimgs-Secondary-Homepage: http: //www.foo.fractals.com/html/post.html
Sender: news@pwa.acusd.edu
Organization: The Fractal Images Company
X-Newsreader: WebReader Version 0.0 (preBeta)
Date: Thu, 7 Mar 1996 15:45:40 GMT
[If you see this message, your news reader is not Fractal aware. Point your
browser to: http://www.fractals.com/webreader/ to learn more.]
This is a test of WebReader.This line should appear as text in the font
chosen by the user, as defined in the Properties file.A horizontal rule
follows:
--------------------------------------------------
FractalNet Advertisers
--------------------------------------------------
*Unordered item #1
*Unordered item #2
*Unordered item #3
*Unordered item #4
1. Ordered item #1
2. Ordered item #2
3. Ordered item #3
4. Ordered item #4
1. Ordered item #5
2. Ordered item #6
3. Ordered item #7
4. Ordered item #8
Real Estate Services
    Swearest thou, ungracious boy? Henceforth, ne'er look upon me.
    There is a devil haunts thee in the likeness of an old, fat man. A
    tun of man is thy companion. Wherein is he neat and cleanly, but to
    carve a capon and to eat it? Wherein is he cunning, but in craft?
    Wherein is he crafty, but in villainy? Wherein is he villainous,
    but in all things? Wherein is he worthy, but in nothing?
--------------------------------------------------
Bob
Bob's address
Term 1:
    This is the first definition
Term 2:
    This is the second definition
Term 3:
    This is the third definition
---
Robert Uomini
The Fractal Images Company (http://www.fractals.com)
Voice: 510-528-0258/800-548-0258
Fax: 510-528-0243
*******************************************************************************
* Buying or selling a home? Come visit the most comprehensive set of    *
* residential real estate listings and related services on the Internet:    *
* The FractalNet Real Estate Server, http://www.fractals.com/realestate    *
*******************************************************************************
2. RESOURCE: htttp://www.primary.fractals.com/docs/post.html (secondary source: http://www.foo.fractals.com/html/post.html)
<html>
<head>
<title>FractalNet Home Page</title>
</head>
<body>
<p>
This is a test of WebReader. This line should appear as text in the font
chosen the user, as defined in the Properties file. A horizontal rule
follows:
<hr>
<h1>FractalNet Advertisers</h1>
<hr>
<ul>
<li>Unordered item #1
<li>Unordered item #2
<li>Unordered item #3
<li>Unordered item #4
<ol>
<li>Ordered item #1
<li>Ordered item #2
<li>Ordered item #3

-continued

Appendix A. Indirect Access Posted File and Components

<li>Ordered item #4
<ol>
<li>Ordered item #5
<li>Ordered item #6
<li>Ordered item #7
<li>Ordered item #8
</ol>
<hr>
<h2><a href="http:realestate.html"><img src="ftp.gif">FTP icon</a></h2>
<blockquote>
Swearest thou, ungracious boy? Henceforth, ne'er look upon me. There is a
devil haunts thee in the likeness of an old, fat man. A tun of man is thy
companion. Wherein is he neat and cleanly, but to carve a capon and to eat it?
Wherein is he cunning, but in craft? Wherein is he crafty, but in villainy?
Wherein is he villainous, but in all things? Wherein is he worthy, but in
nothing?
</blockquote>
<hr>
<address>
Bob
<br>
Bob's address
<br>
</address>
<dl>
<dt>Term 1:
<dd>This is the first definition
<dt>Term 2:
<dd>This is the second definition
<dt>Term 3:
<dd>This is the third definition
</dl>
</body>
</html>
3. RESOURCE: http://www.primary.fractals.com/docs/ftp.gif (secondary source: http://www.foo.fractals.com/html/ftp.gif)
3639364136383540353938333632323236323232313232323232313231
3231323232323232344432323232323232323632323236323232323234
3230252025312725292731293031251826283233302625273645373735 43
3227344332333737292337333435322539412723354125263846281827 17
2725302134462729272830213535322935342823322730193129343427 28
2718321735403944303225222717272036473936252836382629293138 37
2726364125213221262830243128363325242624322638363023224432 24
3343302829183732302930293741323532443335282130203539302035 38
3639252736333126384730312526343730212722302026232519353933 38
3438383737383240383726203123373937342922229173940292136383 538
3124383237393541282534382725312212525251733412825252428193 834
2918344030263641394232243836323535422817312625263120364226 19
2526323933403223373S373432433126373926222822383627273339374 3
3223344236443123383733343323439432628343532243644271729203 834
3238324532453018312829212620282929293029312926292625353726 29
3945354232352727292634372730373436423746283039343639302937 41
2520303025273344344413131252234453439282732233833334626263 025
3438374235433942333227283737343432403640333234373841323625 25
3544374331243132303126243441322536382817251828203847333833 44
3743393729173444364537362820261733422730363627183336383428 28
3838301826253439363934393941272138363223301737473640262034 32
3737344236433539281936463544383335403433272630273441324138 39
2919251833413341344638433225364531222923394230313342272937 36
3542262029252727374536453023262027273942353337363020343633 37
2621383436373226312427273444425233743282732372728344030223 838
2522323432323543

Appendix B. Direct Access Posted File

Newsgroups: misc.test
Path: pwa.acusd.edu!news
From: uomini@fractals.fractals.com
Subject: test
X-Nntp-Posting-Host: sparc5.fractals.com
Content-Type: text/html
Message ID: <DnwMG5.7GK@pwa.acusd.edu>
X-Fractalimgs-Content-Length: 4
X-Fractalimgs-Primary-Homepage: sample.html

| Appendix B. Direct Access Posted File |
| --- |

Sender: news@pwa.acusd.edu
Organization: The Fractal Images Company
X-Newsreader: WebReader Version 0.0 (preBeta)
Date: Thu, 7 Mar 1996 15:45:40 GMT
[If you see this message, your news reader is not Fractal aware. Point your browser to: http://www.fractals.com/webreader/ to learn more.]
This is a test of WebReader. This line should appear as text in the font chosen by the user, as defined in the Properties file. A horizontal rule follows:
---------------------------------------------------
FractalNet Advertisers
---------------------------------------------------
*Unordered item #1
*Unordered item #2
*Unordered item #3
*Unordered item #4
1. Ordered item #1
2. Ordered item #2
3. Ordered item #3
4. Ordered item #4
1. Ordered item #5
2. Ordered item #6
3. Ordered item #7
4. Ordered item #8
---------------------------------------------------
Real Estate Services
    Swearest thou, ungracious boy? Henceforth, ne'er look upon me.
    There is a devil haunts thee in the likeness of an old, fat man. A
    tun of man is thy companion. Wherein is he neat and cleanly, but to
    carve a capon and to eat it? Wherein is he cunning, but in craft?
    Wherein is he crafty, but in villainy? Wherein is he villainous,
    but in all things? Wherein is he worthy, but in nothing?
---------------------------------------------------
Bob
Bob's address
Term 1:
    This is the first definition
Term 2:
    This is the second definition
Term 3:
    This is the third definition
---
Robert Uomini
The Fractal Images Company (http://www.fractals.com)
Voice: 510-528-0258/800-548-6258
Fax: 510-528-0243
***********************************************************************
* Buying or selling a home? Come visit the most comprehensive set of   *
* residential real estate listings and related services on the Internet: *
* The FractalNet Real Estate Server, http://www.fractals.com/realestate  *
***********************************************************************
X-Fractalimgs-Data-Name: sample.html
X-Fractalimgs-Content-Length: 1255
<html>
<head>
<title>FractalNet Home Page</title>
</head>
<body>
<p>
This is a test of WebReader. This line should appear as text in the font chosen by the user, as defined in the Properties file. A horizontal rule follows:
<hr>
<h1>FractalNet Advertisers</h1>
<hr>
<ul>
<li>Unordered item #1
<li>Unordered item #2
<li>Unordered item #3
<li>Unordered item #4
</ul>
<ol>
<li>Ordered item #1
<li>Ordered item #2
<li>Ordered item #3
<li>Ordered item #4
<ol>
<li>Ordered item #5

-continued

Appendix B. Direct Access Posted File

```
<li>Ordered item #6
<li>Ordered item #7
<li>Ordered item #8
</ol>
<hr>
<h2><a href="http:realestate.html"><img src="ftp.gif">FTP icon</a></h2>
<blockquote>
Swearest thou, ungracious boy? Henceforth, ne'er look upon me. There is a
devil haunts thee in the likeness of an old, fat man. A tun of man is thy
companion. Wherein is he neat and cleanly, but to carve a capon and to eat it?
Wherein is he cunning, but in craft? Wherein is he crafty, but in villainy?
Wherein is he villainous, but in all things? Wherein is he worthy, but in
nothing?
</blockquote>
<hr>
<address>
Bob
<br>
Bob's address
<br>
</address>
<dl>
<dt>Term 1:
<dd>This is the first definition
<dt>Term 2:
<dd>This is the second definition
<dt>Term 3:
<dd>This is the third definition
</dl>
</body>
</html>
----------
X-Fractalimgs-Data-Name: ftp.gif
X-Fractalimgs-Content-Length: 1516
3639364136383540353938333632323236323232313232323232323132313
2313232323232323444323232323232323236323232363232323232323432
3025202531272529273129303125182626832333026252736453737354332
7344332333737292337333435322539412723354125263846281827172725
3021344627292728302135353229353428233227301931293434272827183
2173540394430322522227172720364739362528363826292931383727636
4125213221262830243128363325242624322638363022324432243343302
8291837323029302937413235324433352821302035393020353836392527
3633312638473031252634373021272230202623251935393338343838373
7383240383726203123373937342922291739402921363835383124383237
3935412825343827253121252525173341282525242819383429183440302
6364139423224383632353542281731262526312036422619252632393340
3223373537343243312637392622282238362727333937433223344236443
1233837334332343943262834353224364427172920383432383245324530
1831282921262028292930293129262926253537262939435342323527
2 7292634372730373436423746283039343639302937412520303025273344
3441313125223445343928273223383333346262630253438374235433942
3322728373734432403640333234373841323625253544374331243132 30
3126243441322536382817251828203847333833443743393729173444364
5373628202617334227303636271833363834282838383018262534393639
343939412721383632233017374736402620343237374442364335393281 93
6463544383335403433272630273441324138392919251833413341344638
4332253645312229233942303133422729373635422620292527273745364
5302326202727394235333736302034363337262138343637322631242727
3444252337432827323727283440302238382522323432323543
```

What is claimed is:

1. A method of posting articles to a news group in a news network, wherein the articles posted to the news group are directed to readers throughout the news network who choose to read the articles contained in the news group by interacting with a news server site of the news network, the method comprising the steps of:

authoring an article, where the article includes text with markup language formatting embedded in the text;

storing components of the article at a document server;

generating a reference pointer to the document server and a location thereon where the components of the article can be found;

adding the reference pointer to a header of a posting text message, wherein the posting text message is distinct from the article and is usable as a partial replacement for the article when the article is too complex to be transported and displayed on a recipient display; and posting the posting text message to the news group.

2. The method of claim 1, further comprising the steps of:

reading the posting text message from a news server in the news network;

parsing the reference pointer from the posting text message; and retrieving the components of the article from the document server using the reference pointer.

3. The method of claim 1, wherein the article is a combination of text, graphics, applets, controls, links and formatting.

4. The method of claim 1, further comprising the steps of:

generating a secondary reference pointer to a secondary document server and a location thereon where a backup copy of the components of the article can be found; and adding the secondary reference pointer to the posting text message.

5. The method of claim 1, further comprising the step of including, as an attachment, the markup language version of the article in the posting message.

6. The method of claim 1, wherein the posting text message is displayable on a display which cannot display an article with markup language text embedded therein.

7. The method of claim 1, wherein the posting text message uses substantially less storage space on the news server site than the storage space used by the article.

8. A method of posting articles to a news group in a news network, wherein the articles posted to the news group are directed to readers throughout the news network who choose to read the articles contained in the news group by interacting with a news server site of the news network, the method comprising the steps of:

authoring an article, where the article includes text with markup language formatting embedded in the text;

storing components of the article at a document server;

generating a reference pointer to the document server and a location thereon where the components of the article can be found;

adding the reference pointer to a header of a posting text message;

posting the posting text message to the news group;

generating a secondary reference pointer to a secondary document server and a location thereon where a backup copy of the components of the article can be found;

adding the secondary reference pointer to the posting text message;

signalling the document server with a request to return the components of the article; and if the document server fails to respond to the request, sending a request to the secondary document server.

9. A method of posting articles to a news group in a news network, wherein the articles posted to the news group are directed to readers throughout the news network who choose to read the articles contained in the news group by interacting with a news server site of the news network, the method comprising the steps of:

authoring an article, where the article includes components with markup language formatting embedded in text and a plain text component without markup language formatting embedded therein;

including the components of the article as attachments to a posting text message, wherein the posting text message is distinct from the article and is usable as a partial replacement for the article when the article is too complex to be transported and displayed on a recipient display;

referencing the components of the article in a header of the posting text message; and posting the posting text message to the news group.

10. The method of claim 9, further comprising the steps of:

reading the posting text message from a news server in the news network;

parsing the posting text message into the attachments; and generating a markup language page for the article from the attachments.

11. The method of claim 9, further comprising the steps of:

reading the posting text message from a news server in the news network when a reader display cannot display text with embedded markup language formatting; and displaying the plain text component.

12. A method of sending an electronic mail message to a destination in an electronic mail network, the method comprising the steps of:

authoring a message, where the message includes text with markup language formatting embedded in the text;

storing components of the message at a document server;

generating a reference pointer to the document server and a location thereon where the components of the message can be found;

adding the reference pointer to a header of an electronic mail message, wherein the electronic mail message is distinct from the message and is usable as a partial replacement for the message when the message is too complex to be transported and displayed on a recipient display; and posting the electronic mail message to an electronic mail server.

\* \* \* \* \*